US012277819B2

(12) United States Patent
Birnbaum

(10) Patent No.: US 12,277,819 B2
(45) Date of Patent: Apr. 15, 2025

(54) CREDENTIALING METHOD AND APPARATUS FOR FACILITY ACCESS

(71) Applicant: Vendor Credentialing Service LLC, Houston, TX (US)

(72) Inventor: Benjamin Birnbaum, Prairie Village, KS (US)

(73) Assignee: Vendor Credentialing Service LLC, Houston, TX (US)

( * ) Notice: Subject to any disclaimer, the term of this patent is extended or adjusted under 35 U.S.C. 154(b) by 242 days.

(21) Appl. No.: 17/345,921

(22) Filed: Jun. 11, 2021

(65) Prior Publication Data

US 2022/0398886 A1 Dec. 15, 2022

(51) Int. Cl.
*G07C 9/22* (2020.01)
*G07C 9/00* (2020.01)
*G07C 9/27* (2020.01)
*H04W 4/029* (2018.01)
*H04W 4/80* (2018.01)

(52) U.S. Cl.
CPC .......... *G07C 9/22* (2020.01); *G07C 9/00904* (2013.01); *G07C 9/27* (2020.01); *H04W 4/029* (2018.02); *H04W 4/80* (2018.02)

(58) Field of Classification Search
CPC ........ G07C 9/22; G07C 9/00904; G07C 9/27; H04W 4/029; H04W 4/80
See application file for complete search history.

(56) References Cited

U.S. PATENT DOCUMENTS

| 9,374,667 B1* | 6/2016 | Jorgensen | G08C 17/02 |
| 10,304,268 B1* | 5/2019 | Ghenn | G07C 9/29 |
| 2016/0021511 A1* | 1/2016 | Jin | H04W 4/02 |
| | | | 455/457 |
| 2022/0030393 A1* | 1/2022 | Collins | H04W 4/029 |

* cited by examiner

*Primary Examiner* — James J Yang

(74) *Attorney, Agent, or Firm* — Park, Vaughan, Fleming & Dowler LLP

(57) ABSTRACT

A credentialing method and apparatus for facility access. The apparatus can include a system that includes one or more BLE beacons located within proximity to a facility, where one or more of the beacons identifies a location or other information unique to its proximity to the facility. The apparatus can further include an eBadge used by a person seeking access to the facility. The eBadge can also in some embodiments be a BLE beacon. Interaction between the one or more BLE beacons, a credentialing provider's app operating on the person's mobile device, and the person's eBadge operate in the system to perform a method of controlled access to the facility. In some embodiments, administrators with access to the credentialing provider's app also can control, monitor, report, and observe details concerning such facility access.

46 Claims, 7 Drawing Sheets

CREDENTIALING METHOD AND APPARATUS FOR FACILITY ACCESS

TECHNICAL FIELD

Embodiments of the subject matter disclosed herein generally relate to methods and systems for ensuring that only entities (whether they be persons or things) that meet pre-set criteria are allowed to enter an environment that could be compromised by an entity entering that environment that does not meet the pre-set criteria. In this regard, one embodiment of the present invention is directed to vendor credentialing, where vendors desiring entry to heath care organizations must first meet certain pre-set credentials before being allowed to enter that health care organization's facility.

DISCUSSION OF THE BACKGROUND

The modern-day explosion in population, disease, harmful substances, dangerous environments, contamination, and crime has given rise to the field of credentialing, which generally concerns taking steps to ensure that people and things are not allowed to go places or encounter things they should not. One example is the health care field. There, a host of environments exist in which it is important that only authorized personnel and/or devices be allowed to interact in proximity to one another. In other words, only personnel and/or a device that meets a common set of pre-established credentials will be allowed to interact within proximity to one another.

As one non-limiting example, take vendors (e.g., service or product providers) who wish to enter a health care facility (e.g., a hospital, doctor's office, or emergency care facility) to sell, service, or otherwise offer their third-party offerings to the operators of the health care facility. In the past, these individuals may have been allowed to enter the facility uninterrupted, without any admittance criteria or standards. The health and safety risks associated with such uninhibited or "free" access are obvious and, as such, are now often prohibited by federal, state, local, and/or best practices guidelines.

As referenced above, the process of controlling vendor access to facilities is one form of credentialing. In the health care environment, one method of credentialing requires vendors to approach a designated screening representative at each health care facility the vendor visits, so that the screening representative can invoke that facility's established protocol for deciding whether to allow the vendor access to the facility. This method is disfavored due at least to its burden on personnel, necessary training, consequential front-office congestion, lack of contemporaneous access to updated and/or accurate vendor data, and the costs associated therewith.

Another credentialing option is for the health care facility to use the services of an outside, third-party credentialing provider. One well-known and often-used provider is VCS, Inc. (https://www.symplr.com), also known as Symplr.

Credentialing providers require vendors to register with them so that the provider (instead of the health care facility) performs at least the same credentialing the health care facility would, but the credentialing is done off-site from the health care facility and in a manner that each individual vendor's credentials are investigated, verified against the credentials mandated by each pertinent/participating health care facility, and stored for future use, updating, and network access at least by the credentialing provider. After a vendor is approved for access to a particular facility, the credentialing provider traditionally gave the qualified/credentialed vendor a badge that typically contained a bar code and possibly other identifying information (such as a photograph), which the vendor used to authenticate himself in two primary respects when entering a participating health care facility.

First, the bar code on the vendor's badge could be scanned at a kiosk or other scanning facility in the lobby of the health care facility. The kiosk often was computer-implemented and possessed either local or networked access to a database maintained by the credentialing supplier, such that the kiosk used the bar code to identify the vendor and then access and examine the associated vendor's credentials relative to those mandated by the pertinent health care facility. Through this computerized process, the kiosk either approved or denied the vendor's access to the health care facility. This approval process could also entail either the printing of an entrance sticker (to be worn by the vendor), open a locked door, or provide other authorized passage.

Second, as mentioned above, while the badge also may have provided photo identification, in those instances in which the kiosk prints an entrance sticker, the kiosk could also print an additional code on the sticker. This additional code could provide opportunity for on-the-spot verification by facility personnel as an added security measure after the vendor had gained access to the facility.

More recently, some credentialing providers have started providing vendors with electronic badges as a substitute for the traditional vendor badge and/or printed sticker. One such system and method is described in U.S. Pat. No. 10,304,268, which is incorporated herein by reference.

In one such scenario, as an example, a vendor identifies (on a credentialing agent's website or via a smart phone application supported by the credentialing agent) a location he wishes to visit and then sends the credentialing agent all the access requirements/credentials necessary for visiting that location. The credentialing agent then either approves or disapproves the visit based at least upon a comparison between the vendor-provided credentials and the requisite credentials the location previously supplied to the credentialing agent. (While other credentialing steps can be taken, the process of credentialing is well known and will be appreciated by those skilled in the art.)

If access is approved, the vendor then travels to the location he wishes (and has been approved) to visit and, upon being within a predefined distance of the location (such as one mile), the vendor activates the credentialing provider's mobile application on the vendor's mobile device to execute a "check-in" procedure. The check-in procedure will only proceed if the vendor is within the requisite distance of the desired location, as determined by the GPS and mapping functionality of the vendor's mobile device. As part of the check-in procedure, the mobile application establishes an electronic (such as Bluetooth) connection between the vendor's mobile device and the vendor's electronic badge to update the badge's display to indicate that the vendor has been given permission to access the location (assuming such permission is still available/authorized), such as displaying a facial photo of the vendor and some sort of "access permitted" designation. By visibly wearing the electronic badge throughout the vendor's visit, facility personnel are assured that the vendor is an "authorized" visitor. A "check-out" procedure likewise can be invoked if the mobile device detects that the vendor has travelled outside one or more virtual boundaries associated with the facility and/or the vendor has exceeded a pre-designated time within the virtual boundaries. The check-out procedure will likewise update the vendor's electronic badge to display some sort of "access expired" designation, which is also visible to facility personnel.

Problems abound with these prior art credentialing processes. Kiosks are expensive to install and maintain, whether by the health care facility or a credentialing provider. Likewise, the computer hardware implemented by the kiosk often quickly becomes outdated, lacks software updates, is susceptible to network interruptions or outages, and/or becomes incompatible with hardware updates at the health care facility or the credentialing provider. Likewise, if a vendor loses his printed/paper badge, he either must endure the disruption of being denied access while he acquires a new badge, or he might circumvent the health care facility's vendor entry requirements, thereby destroying the entire credentialing process and the safeguards afforded thereby.

The GPS functionality employed by certain of these prior art systems also has inherent limitations that diminish the suitability of credentialing methods that employ that functionality. For example, locations/facilities that are close in proximity may not be distinguishable using GPS functionality, such that a vendor's mobile device is unable to distinguish whether the vendor is at one location versus another location, where the locations are geographically proximate one another. Nor is GPS functionality sometimes robust enough to provide other useful data to the mobile device, such as address information, location names, floor level, door number, and a host of other location or other information important to the credentialing, entry, and exit processes. Nor can such functionality be used to distinguish altitudes, such as distinguishing between floors of a multistory building; and, obviously, it is susceptible to inaccuracies in the GPS system, as well as the availability of cellular and/or WI-FI service.

SUMMARY

The present invention addresses the disadvantages and drawbacks of current credentialed facility access and the apparatuses associated therewith. In one embodiment, the apparatus can include a system that includes one or more BLE beacons with one more BLE listening points located within proximity to a facility, where one or more of the beacons identifies a location or other information unique to its proximity to the facility. In some embodiments, the apparatus can further include an eBadge used by a person seeking access to the facility. The eBadge can also in some embodiments be a BLE beacon. Interaction between the one or more BLE beacons, a credentialing provider's app operating on the person's mobile device, and the person's eBadge operate in the system to perform a method of controlled access to the facility. In some embodiments, administrators with access to the credentialing provider's app also can control, monitor, report, and observe details concerning such facility ingress, egress, and on-premise visit.

Variants of the present invention are possible and are within the scope of this disclosure, whether expressly identified or not. For example, the credentialed access process could be carried out for people (or things such as equipment, drugs, devices, etc.) other than vendors, and such credentialed access could be performed for any industry other than the health care industry.

BRIEF DESCRIPTION OF THE DRAWINGS

The accompanying drawings, which are incorporated herein and constitute a part of the specification, illustrate one or more embodiments and, together with the description, explain these embodiments. In the drawings.

DETAILED DESCRIPTION

Figure 1:
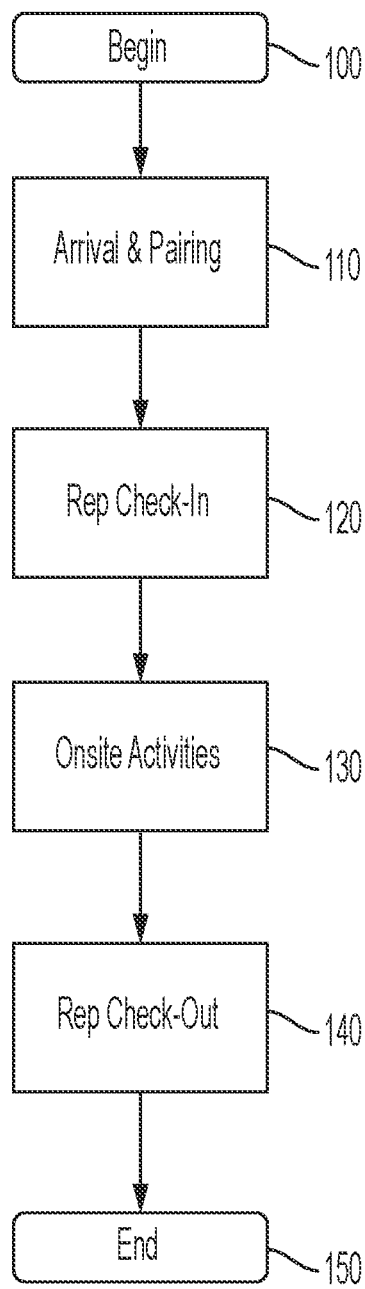
FIG. 1 is a high level workflow for one embodiment of the present invention.

The following description of the exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" (or variants thereof) in various places throughout the specification is not necessarily referring to the same embodiment. Further, the particular features, structures or characteristics may be combined in any suitable manner in one or more embodiments.

The present invention makes use of an electronic identification badge, or "eBadge", which is a well-known device to those skilled in the art. An exemplary eBadge is Picolabel, manufactured by Mpicosys, the details of which can be found at https://www.mpicosys.com/epaper-labels-picolabel-nfc-updated-no-battery-epaper-labels/.

In some embodiments the functional requirements of an exemplary eBadge include one or more of the following: (1) the eBadge pairs with a credentialing agent's application (or "app") to support encrypted communications between the vendor's user account and the eBadge; (2) the eBadge has a selectable Bluetooth Low Energy ("BLE") beacon transmission rate; (3) the paired eBadge receives and displays an image transmitted via the credentialing agent's mobile application; (4) the eBadge has an internal timer to track the duration of display; (5) the eBadge is able to change its display to an expired state without interaction with the credentialing agent's services; (6) the eBadge supports a motion sensor that will wake the battery when movement is detected; (7) the eBadge emits a BLE beacon for 24 hours after activation then ceases, unless the vendor is able to successfully reactivate via a subsequent check-in and sync event; (8) the eBadge is battery powered with the flowing characteristics: (a) the battery is user replaceable; (b) the battery is commonly available for retail purchase (such as CR2032, AAA); and (c) the battery supports normal operations for one year before needing replacement; and (9) the eBadge has compatibility with Samsung or other Android (Android 5.0 or higher) and iPhone (iPhone 5 and above, iOS 9.0 or above).

In some embodiments the physical requirements of an exemplary eBadge include one or more of the following: (1) support of a 4.01 inch N-color e-Ink display (iAB1024-DOB) in portrait orientation; (2) weigh no more than 85 grams or 3 ounces; (3) be no more than 0.5 inches at its thickest point; (4) be able to be worn via an attachable lanyard; and (5) employ a casing able to display registered markings for performance and quality testing.

In some embodiments the performance and reliability requirements of an exemplary eBadge include one or more of the following: (1) able to operate in a temperature range of 20 to 130 degrees Fahrenheit; (2) protect from foreign objects and substances up to a 5.4 IP rating (partial protection against dust that may harm equipment), protection against low-pressure jets (6.3 mm) of directed water from any angle, and limited ingress permitted with no harmful effects; (3) durable and able to withstand impacts up to 6 feet to a concrete floor; and (4) able to resist scratching up to 3H on Mohs hardness scale.

In some embodiments the security requirements of an exemplary eBadge include one or more of the following: (1) a mechanism to identify whether the eBadge is supplied by the credentialing provider with a unique identifier, which has to be provided to the credentialing provider by the manufacturer; (2) a mechanism to identify whether the beacon eBadge is supplied by the credentialing provider with a unique identifier, which has to be provided to the credentialing provider by the manufacturer; (3) support PKI infrastructure where the credentialing provider keeps the private key, and the public key is imprinted in the eBadge; (4) the credentialing provider provides an OAuth2.0 API to obtain the public key for each badge (private-public key pair will be generated by the credentialing provider and against a provided badge unique identifier); (5) a possibility to set the certificate or key provided by the credentialing provider in the factory for each eBadge device separately for further communication (eBadge writing and time clock synchronization); (6) the public key/certificate should not be read from the eBadge device by any means; (7) only the credentialing provider should be able to write into the eBadge device display and the eBadge should decrypt the message before writing badge to display; (8) only the credentialing provider should be able to synchronize the clock in the eBadge device and the eBadge should decrypt information before synchronizing the clock; (9) a provision to pass appointment expiry details along with digital badge image as an encrypted message and the eBadge device should take the data after decrypting; and (10) an integrated circuit program which keeps track of the expiry time and manages badge state change in a secure way, which should not expose any credential or introduce any vulnerability for writing into the badge to the outside world.

In addition to an eBadge, the present invention also makes use of one or more BLE beacons, which are well known to those skilled in the art. An exemplary BLE beacon is Zebra Bluetooth Bridges, manufactured by Zebra, the details of which can be found at https://www.zebra.com/us/en/products/spec-sheets/location-technologies/bluetooth-beacons/mb5000-mb6000.html. As explained above, BLE stands for Bluetooth Low Energy. Bluetooth Low Energy is a form of wireless communication designed especially for short-range communication. BLE is similar to Wi-Fi in the sense that it allows devices to communicate with each other. However, BLE typically is meant for situations where battery life is preferred over high data transfer speeds. Most smart phones and tablets today are BLE compatible, which means they can seamlessly communicate with Bluetooth enabled wireless headphones, digital signage, car stereos, fitness trackers, smart watches, and hardware devices like beacons.

BLE data transfer is essentially one-way communication. Consider as an example BLE beacons trying to communicate with a smart phone in close proximity—a Bluetooth Low Energy beacon device broadcasts packets of data at regular intervals of time. These data packets are detected by an app or other pre-installed services on nearby smart phones. This BLE communication triggers actions such as pushing a message to the smart phone screen. Other actions are described in more detail below, but suffice it to say that the actions can be anything the app or other pre-installed service is designed to support/implement.

To save energy and provide higher data transfer speed, the entire BLE communication framework consists of 40 frequency channels, separated by 2 MHz. Three of these channels are the primary advertisement channels, while the remaining 37 channels are secondary channels, also known as data channels. The Bluetooth communication starts with the 3 primary advertisement channels and then offloads to the secondary channels.

BLE beacons, as the name suggests are beacons that communicate via Bluetooth Low Energy. Beacon devices are small radio transmitters, strategically mounted throughout locations, to broadcast low energy Bluetooth signals in a given range. This range depends on hardware capability. On average, a beacon device can transmit BLE signals to 80 meters.

As indicated above, this BLE signal from the beacon is capable of triggering a specific action in a receiving device. This is accomplished by the BLE beacon sending out an ID number via BLE channels, approximately 10 times every second. A Bluetooth-enabled device in proximity of the beacon picks up this ID number. When an app or pre-installed service like Google Nearby recognizes the ID number, it links the ID to an action, such as downloading an app, or piece of content (maybe a marketing offer) stored on the cloud, which is then displayed on the smart phone.

In the case of the present invention, the ID number is (in one embodiment) associated with a location of the BLE beacon. As such, the ID number could designate a facility, such as a specific building, a specific parking lot, a particular entrance, a door, a stairway, and area of a facility, etc. It could also designate an address or any other bit of information the user (in this case the credentialing provider and/or facility) chooses to assign to the ID number. As such, when a vendor's smart phone detects a BLE beacon previously established by a credentialing provider, the beacon not only activates the credentialing provider's app on the vendor's smart phone, but the app uses the BLE beacon ID to determine exactly where the vendor is by referring to a lookup table (or any other similar mechanism) that translates the beacon ID to the information assigned to it by the credentialing provider.

Of note, and as also referenced above, eBadges also can be BLE beacons. As such, an eBadge can transmit an "ID" that identifies any information about the badge a credentialing provider chooses to associate with that ID. For example, consistent with embodiments of the present invention, the credentialing provider could associate information with a badge ID such as the name of the vendor assigned to that badge, his occupation, his employer, his photo, his age, his credentialing information, and/or any other information the credentialing provider chooses. In this manner, anyone receiving an ID number from a vendor's eBadge/BLE beacon can—assuming he has authority via the credentialing provider's app (which is within the scope of the present invention)—identify the vendor and be informed of whatever other information is associated with that ID number.

Likewise, assuming the credentialing vendor's app and associated system stores the pertinent information (which is within the scope of the present invention), it also can be determined where the vendor is located if the system stored the locations of the vendor's recently visited BLE beacons. A map can even be generated to trace the travel path of a vendor and/or that of all (or a subset thereof) of eBadges supported by the credentialing provider. The credentialing provider can even provide privileges to users so as to dictate the level of informational detail accessible by such users about the eBadges in use.

The use of eBadges and BLE beacons in various embodiments and in context with the present invention is further described below in connection with FIGS. 1-5.

FIG. 1 illustrates an exemplary high-level workflow of one embodiment of the present invention. The workflow begins at step 100 and proceeds to step 110, where arrival (to the vendor) and pairing (with the credentialing service) of the eBadge occurs. There is a host of well-known ways in which a vendor might receive an eBadge, each of which is within the scope of the present invention. In one embodiment, the vendor and the credentialing provider establish a relationship after which the credentialing provider arranges for the shipment of an eBadge to the vendor, after which the vendor pairs the eBadge with the credentialing providers service (as described in more detail below). Next, at step 120 the Rep (or vendor) checks-in, i.e., the step in which the vendor checks in to the facility to which he desires access. The workflow progresses from step 120 to step 130, at which point the vendor carries out his onsite activities at the facility, whatever they may be. Finally, step 140 symbolizes the Rep (or vendor) check-out procedure, which takes place after the vendor has concluded his on-site activities, his authorized time at the facility has expired, and/or he desires to exit (or has exited) the facility.

Figure 2:
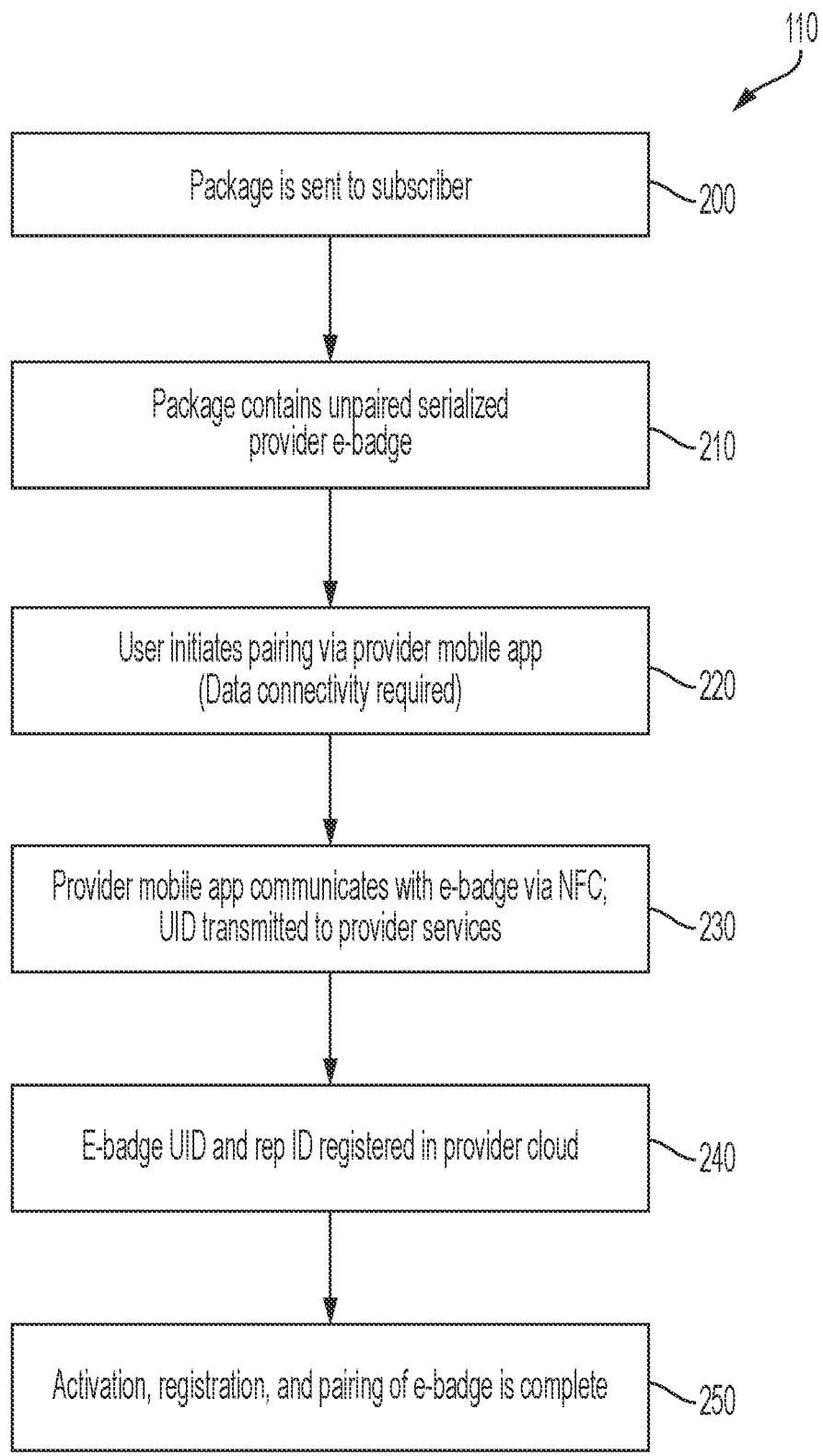
FIG. 2 is a high level workflow for one embodiment of the arrival and pairing process.

FIG. 2 illustrates exemplary detail for an embodiment of the arrival and pairing step 110 of FIG. 1. Specifically, at step 200 a package is sent to a vendor that has subscribed to a credentialing provider's service. The package may have been ordered for delivery by the credentialing provider or otherwise, such as by the vendor himself. As shown at step 210, the package contains an unpaired, serialized eBadge supported by the credentialing provider. At step 220, the vendor initiates pairing of the eBadge with the credentialing provider's mobile application. (As step 220 shows, data connectivity for the credentialing provider's mobile application is required at this step.) Those skilled in the art will appreciate other methods and techniques of pairing, each of which is within the scope of the present invention.

At step 230 of this particular embodiment, the credentialing provider's mobile application communicates with the eBadge via NFC so that the UID of the eBadge can next be transmitted to the credentialing provider's services. At step 240 the eBadge UID and the vendor ID are registered with the credentialing provider's services. Finally, at step 250, activation, registration, and pairing of the eBadge is complete. As will be apparent to those skilled in the art, this arrival and pairing process can include additional steps and need not necessarily include all of the steps identified in FIG. 2.

Figure 3A:
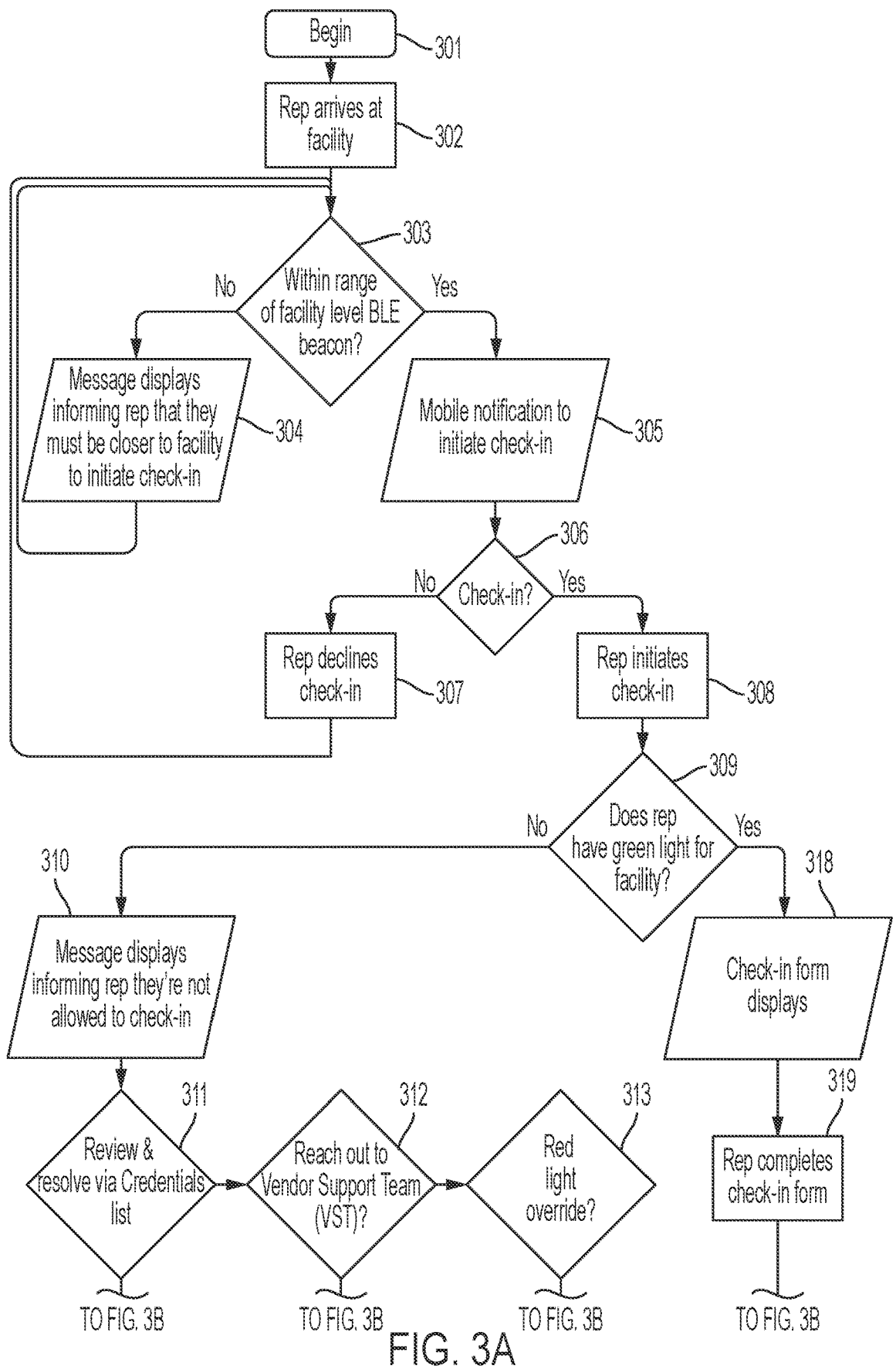
FIG. 3A-3B is a workflow for one embodiment of a representative's arrival at a facility.
Figure 3B:
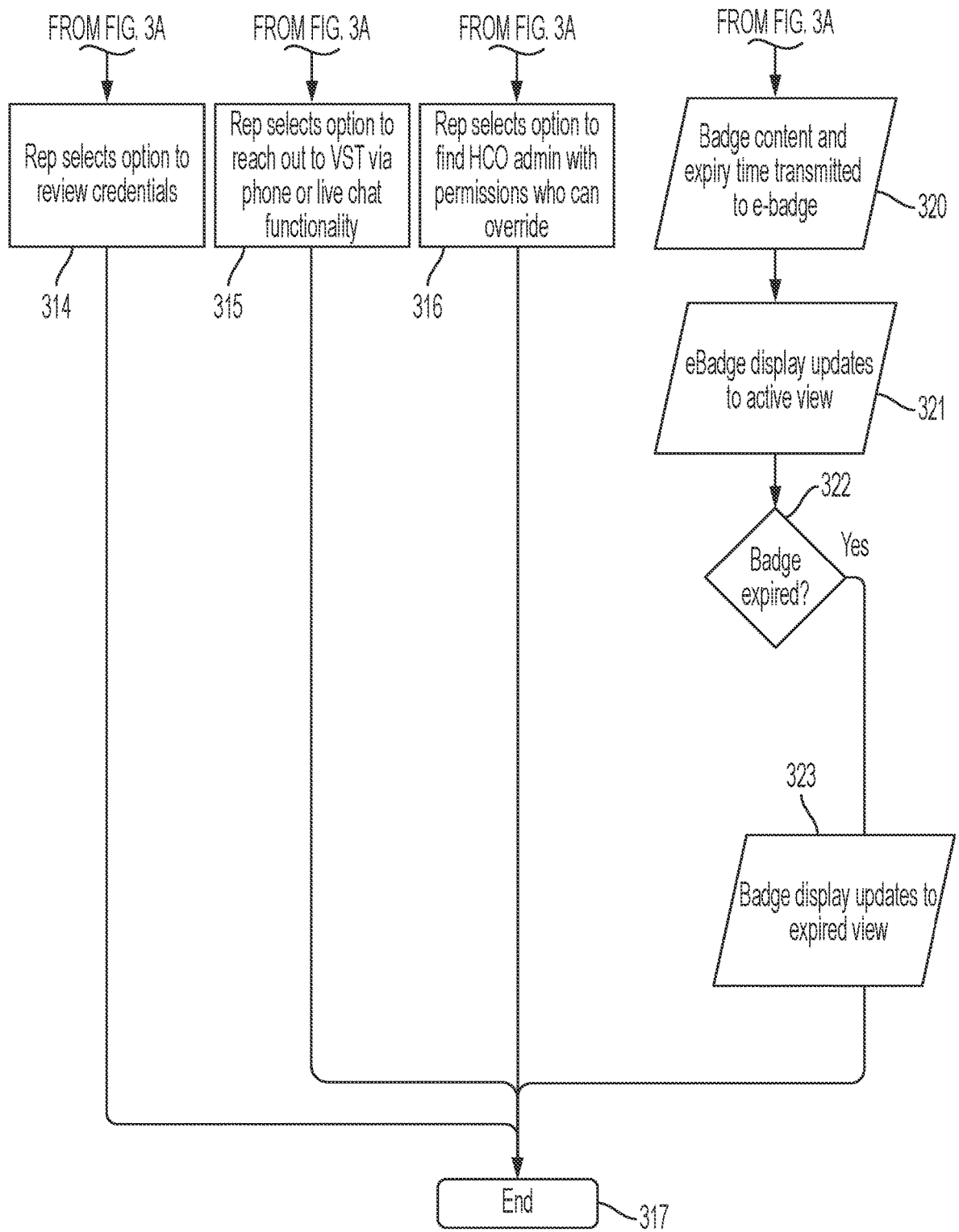

FIGS. 3A-3B illustrate an exemplary workflow for one embodiment of the present invention in which a vendor arrives at a facility he desires to access. The workflow begins at step 301. From step 301, the flow moves to step 302, where the vendor arrives within the vicinity of the facility. If the vendor is within range of a facility level BLE beacon, as represented at step 303, the workflow moves to step 305, where the credentialing application on the vendor's mobile device will (in response to receiving data from the facility level BLE beacon) message the vendor to begin the check-in procedure. If, however, the vendor is not within range of the facility level BLE beacon, the credentialing application on the vendor's mobile device will message the vendor, as shown at step 304, that the vendor must be closer to the facility before being able to initiate a check-in procedure. At that point flow returns to step 303.

The check-in procedure is illustrated beginning at step 306. If the vendor declines to check-in, as illustrated at step 307, the workflow returns to step 303. If, however, the vendor decides to affirmatively check-in, the workflow progresses to step 309 where the credentialing application on the vendor's mobile device determines whether the vendor is authorized for entry. As will be understood by those skilled in the art, such authorization can be based on a host of factors, such as credentialing, facility authorization, etc. If the vendor is authorized for entry, the workflow progresses to step 318 where the credentialing application on the vendor's mobile device displays a check-in form for the vendor to complete. If the vendor is not authorized for entry, the workflow progresses to step 310 where the credentialing application on the vendor's mobile device displays a message informing the vendor that he is not permitted to check-in.

After displaying the deny-check-in message at step 310, the workflow moves to step 311, where the vendor is given the option of reviewing and resolving his issue via a credentials list. Each facility has a unique set of requirements for access. When a vendor has not satisfied all of the requirements they will not be allowed to check-in. Examples include completion of health screenings and trainings, as well as reviewing and signing policy documentation. Resolving any issues with these items would be required before engagement. At step 311, the vendor has two options. He can select an option to review his credentials at step 314 (see FIG. 3B) or he can reach out to vendor support at step 312. At step 312, the vendor has two options. He can select an option to reach out to vendor support via phone or live chat at step 315 (see FIG. 3B) or he can reach out to the appropriate facility personnel at steps 313 and 316 (see FIG. 3B) in an effort to override the prior denial of his access. In any of the cases after steps 314, 315, and/or 316, the workflow ends at step 317 (see FIG. 3B).

Returning to the case in which the vendor was permitted to check in at step 309, the workflow continues to step 318 where the credentialing application on the vendor's mobile device displays a check-in form for the vendor to complete. The vendor completes the check-in form at step 319, at which point the credentialing application on the vendor's mobile device transfers content to the vendor's eBadge at step 320 (see FIG. 3B). This content can be a variety of information in different embodiments, which can include one or more of a photo image of the vendor, an "access permitted" notation, a colored background or other designation indicating access is permitted, a timer of permitted access, and/or any other text, images, functions, or notations deemed useful for display on the eBadge during the vendor's presence inside the facility.

At step 321, the eBadge display updates to an active view until it is determined, at step 322, whether the badge has expired. A badge might expire for a host of reasons known to those skilled in the art, such as the expiration of a pre-designated time that the vendor is allowed on premise, revocation of a vendor's credentials, contemporaneous instructions from the facility or credentialing provider, the vendor's travel/presence in an unauthorized location (as detected by another BLE beacon in the facility), etc. If the eBadge expires, the workflow moves to step 323 at which point the eBadge display updates to an expired view. The content of the expired view can be a variety of information in different embodiments, which can include one or more of the removal of the vendor's photo image, an "access expired" notation, a colored background or other designation indicating access is denied/expired, an expired timer of permitted access, and/or any other text, images, functions, or notations deemed useful for display on the eBadge to denote the fact that the vendor's access privileges have expired. The workflow then proceeds to step 317, at which point the process can begin again at step 301.

Figure 4A:
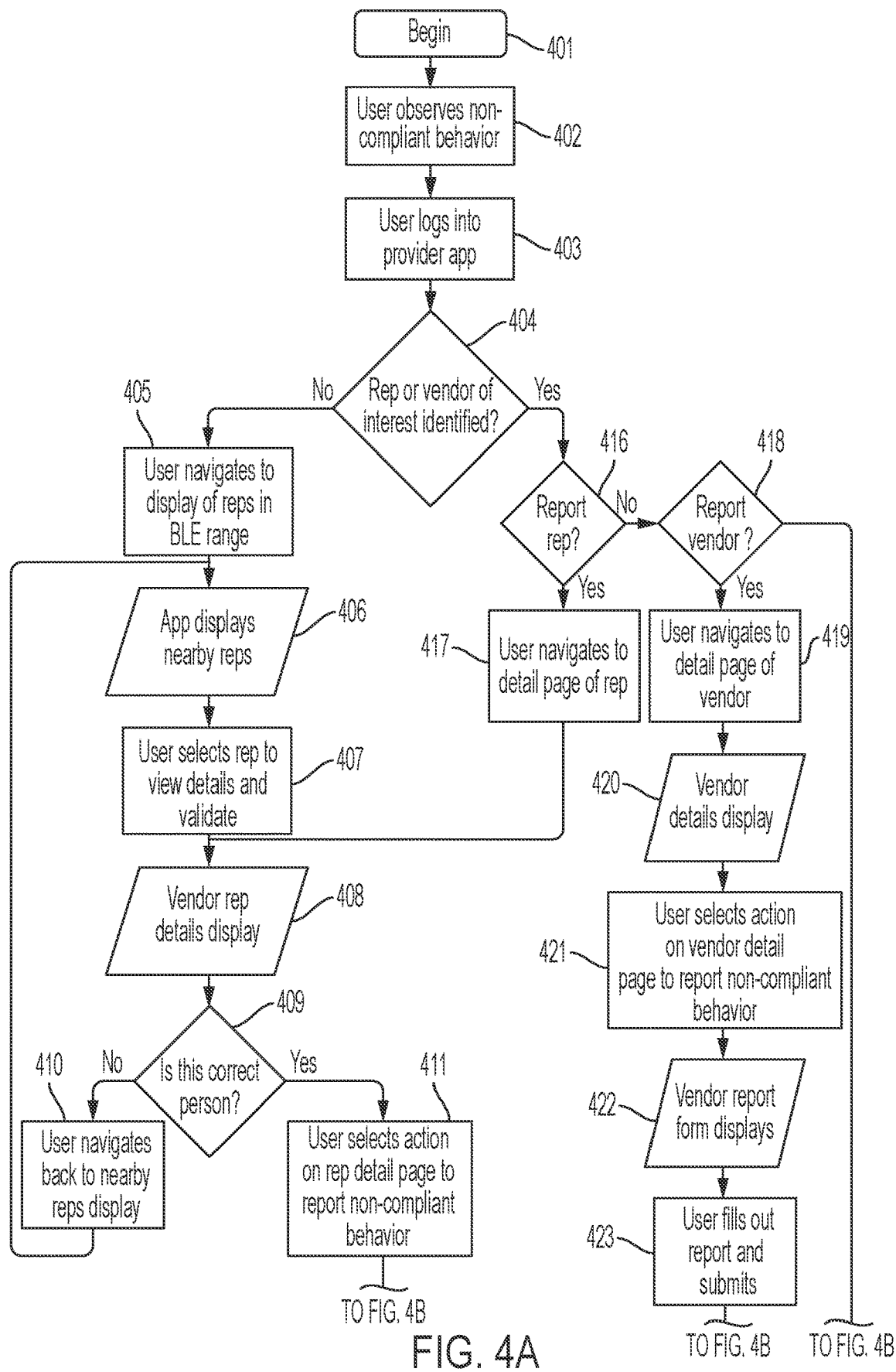
FIG. 4A-4B is a workflow for one embodiment of a user observing a representative or vendor exhibiting non-compliant behavior.
Figure 4B:
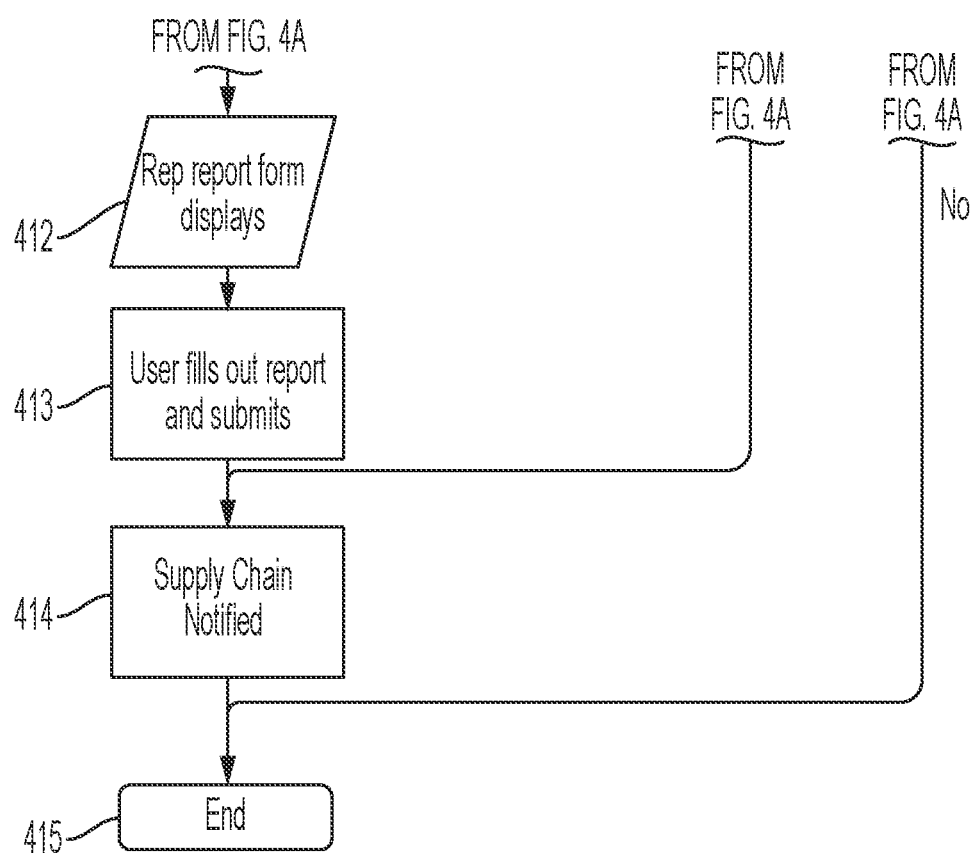

FIGS. 4A-4B illustrate an exemplary workflow for one embodiment of the present invention in which a vendor or representative of a vendor is observed exhibiting non-compliant behavior, i.e., behavior inconsistent with the rules, regulations, best practices, procedures, etc. of the facility being visited. It should be noted that vendor and representative are at times used synonymously. A vendor is a generic name for an entity that seeks to sell something to someone, whereas a representative is the person/employee/rep of the vendor who actually does the selling. Those of skill in the art will understand from context when the two terms are used synonymously and when they are not.

The workflow of FIG. 4A begins at step 401 and moves to step 402, at which step a user (of the credentialing provider's app) observes a vendor or representative exhibiting non-compliant behavior. This user could be, for example, an employee of the facility the representative is visiting. As this point, the user has the option of addressing the non-compliant behavior in a number of manners, one being to log on to the credentialing provider's app, as shown in step 403. At step 404 it must be determined whether the user already knows the identity of the offending vendor or representative. If so, the workflow proceeds to step 416. If not, the workflow proceeds to step 405.

At step 405, the user navigates through the credentialing provider's app to the functionality that enables the user to display the representatives who are in BLE range of the user's mobile device. Recall that each representative's eBadge can itself a BLE beacon and, as such, the user's mobile device (equipped with the credentialing provider's app) will be able to detect all such beacons within its BLE range. At step 406, the app displays all representatives in BLE range. At step 407, the user selects a representative in BLE range in order to view, at step 408, the account details of such representative. The account details of a representative can include a photo of the representative, his name, address, employer, height, weight, credentials, and any other detail the credentialing provider may have collected and stored in that representative's account information. The user can use that information at step 409 to assess whether the offending representative matches with the representative being viewed on the credentialing provider's app. If there is no match, the workflow proceeds to step 410, at which the workflow proceeds back to step 406 to identify another representative in BLE range so as to thereafter assess (at steps 407-409) whether that is the offending representative. If there is a match at step 409, the workflow proceeds to step 411.

Step 411 illustrates the functionality of the credentialing provider's app that allows a user to select certain actions to take in response to the representative's non-compliant behavior. Upon selecting an action, the credentialing provider's app generates/displays a representative report form at step 412 (see FIG. 4B). The user completes and submits the report at step 413, which at least results in notification to the supply chain at step 414, whether the supply chain be one or more of the credentialing provider, facility management, facility security, vendor, representative, etc. The workflow thereafter ends at step 415.

Referring back to step 404 to the scenario in which the offending vendor's or representative's identity is known. In that case, the workflow proceeds to step 416 where a decision is made to report the representative. If the decision is made to report the representative, the workflow moves to step 417 where the user navigates to the detail page for the representative and then to step 408 to complete the identifying and reporting steps as previously described.

If, however, at step 416 the user decides not to report the representative, then the workflow continues to step 418, where a decision is made on whether to report the vendor. If the decision (by the user) is made to not report the vendor, the workflow moves to step 415 (see FIG. 4B) where the workflow ends. If the decision is made to report the vendor, then the workflow moves to step 419, where the user navigates to the detail page of the vendor as supplied by the credentialing provider's app. The account details for the vendor are next displayed at step 420. The account details of a vendor can include the vendor's name, address, contact information, products sold, authority figures within the vendor's organization, representatives of the vendor and corresponding representative information as described above, and any other detail the credentialing provider may have collected and stored in that vendor's account information.

Step 421 illustrates the functionality of the credentialing provider's app that allows a user to select certain actions to take in response to the decision to report a vendor in light of non-compliant behavior by a representative. Upon selecting an action, the credentialing provider's app generates/displays a vendor report form at step 422. The user completes and submits the report at step 423, which at least results in notification to the supply chain at step 414 (see FIG. 4B), whether the supply chain is one or more of the credentialing provider, facility management, facility security, vendor, representative, etc. The workflow thereafter ends at step 415.

Figure 5:
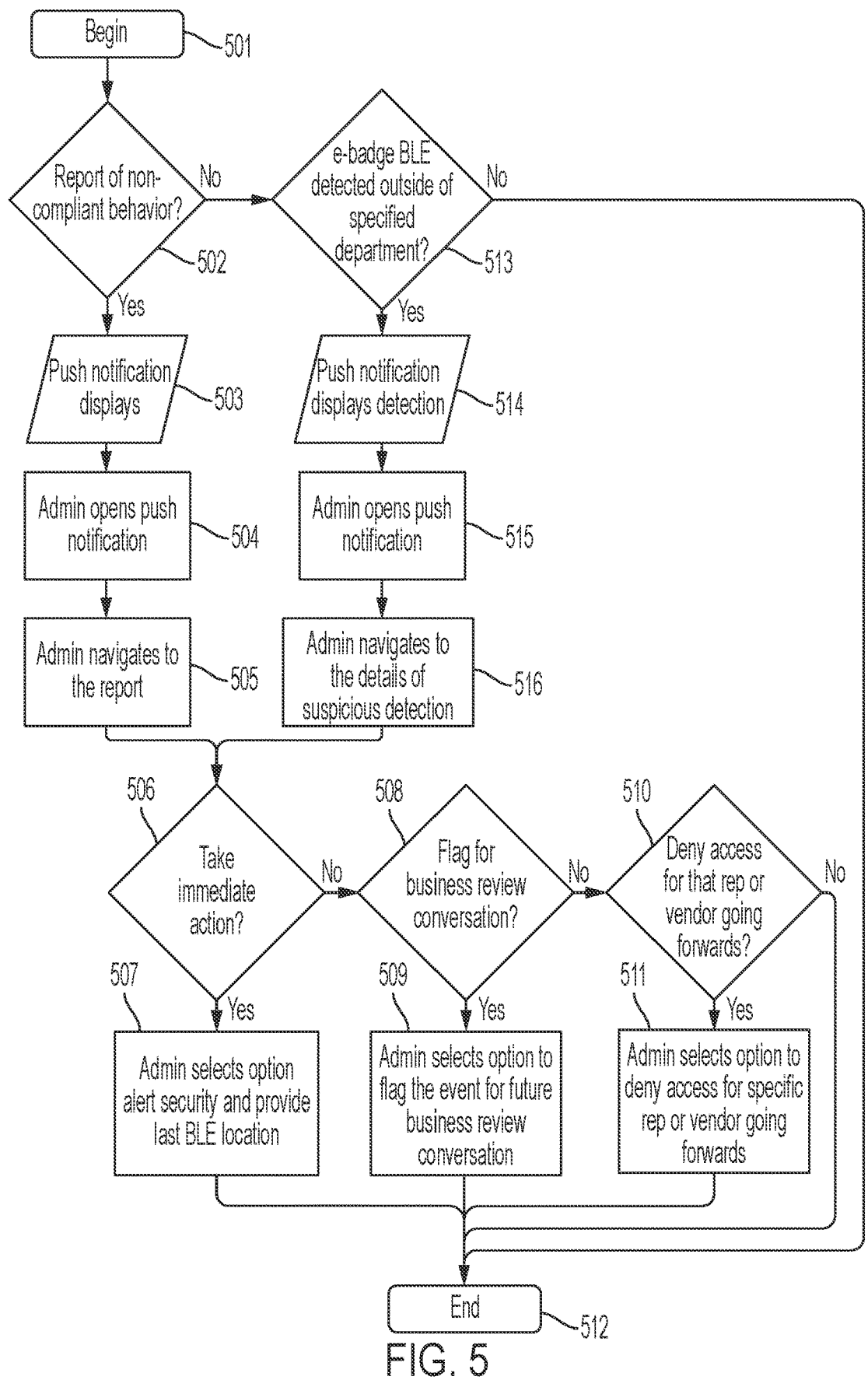
FIG. 5 is a workflow for one embodiment of a supply chain administrator.

FIG. 5 illustrates an exemplary workflow for one embodiment of the present invention in which a supply chain administrator processes receipt of non-compliant behavior. The workflow begins at step 501 and moves to step 502, where a decision is made as to whether or not a report of non-compliant behavior has been received. If a report has not been received, the workflow progresses to step 513, which is described in below in more detail. If a report has been received, the workflow progresses to step 503, where a push notification is displayed on the supply chain administrator's mobile or desktop device as a result of running the credentialing provider's app.

At step 504, the administrator opens the push notification received at step 503. At step 505, the administrator navigates to the reporting functionality of the credentialing provider's app, which gives the administrator a menu of reporting/responsive options, such as flagging the vendor and incident for discussion at a future business review with the vendor, denying future entry of the vendor, determining the vendor's current location, dispatching security to find the vendor, etc. From step 505, the workflow progresses to step 506, where there is an option for the administrator to take immediate action. If immediate action is not taken, the workflow proceeds to step 508. If immediate action is taken, the workflow proceeds to step 507, wherein the administrator selects the option to alert security and provide the last BLE location of the offending eBadge. This portion of the workflow then ends at step 512 after executing step 507.

If immediate action is not taken at step 506 and the workflow progresses (as indicated) to step 508, then at step 508 it is decided by the administrator whether to flag the non-compliant behavior for business review conversation. If the decision is made to flag the event, the workflow progresses to step 509 where the administrator selects an option from the credentialing provider's app to flag the event for future business review conversation. If the decision is made to not flag the event, then the workflow proceeds from step 508 to step 510. At step 510, the administrator makes a decision on whether to deny access for the offending representative and/or vendor going forward. If the decision is made to deny access, the workflow progresses to step 511 where the administrator selects an option from the credentialing provider's app to deny access to a specific representative or vendor going forward. If the decision is made to not deny access, the workflow progresses from step 510 to step 512 where this portion of the workflow ends.

Returning step 502 where it is determined whether or not a report of non-compliant behavior has been received, as indicated above, the workflow progresses to step 513 if it is determined that no report of non-compliant behavior has been received. At step 513, it is determined whether an eBadge BLE has been detected outside a specified department, i.e., in a location of the facility the vendor/representative is not authorized to be. Such detection can be made in several manners. For example, a vendor/representative's app might detect a transmission from BLE beacon located in a part of the facility the vendor/representative is not authorized to access. In such instance, the app will record the instance and report to one or more of at least the facility personnel and/or the credentialing provider the fact that the vendor/representative has been located in an unauthorized location.

If no such detection is made, the workflow progresses from step 513 to step 512 where this portion of the workflow ends. If such detection is made, the workflow progresses from step 513 to step 514, where a push notification is displayed on the supply chain administrator's mobile or desktop device as a result of running the credentialing provider's app. The administrator opens the push notification at step 515. At step 516, the administrator navigates to the details of the suspicious detection, such as the vendor is in an unauthorized location, the vendor loiters in an area he or she is not authorized for, or the vendor stays onsite past his or her authorized visitation. From step 516, the workflow progresses to step 506, where there is an option for the administrator to take immediate action. Thereafter, the workflow progresses as described above with respect to steps 506-512.

As indicated above, it should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method of using a smart phone and an eBadge for facility access, including the steps of:
    the smart phone receiving a signal from a BLE beacon have a physical location, wherein the signal from the BLE beacon includes data embedded therein for identifying the physical location of the BLE beacon and that the smart phone uses to identify its location relative to the physical location identified by the data embedded in the signal from the BLE beacon;
    determining whether entry to the facility is authorized;
    if entry to the facility is authorized, transferring displayable content from the smart phone to the eBadge indicating access is authorized;
    determining whether entry to the facility is no longer authorized by using at least a second smart phone to display information associated with eBadges within BLE range of the second smart phone;
    if entry to the facility is no longer authorized, transferring displayable content from the smart phone to the eBadge indicating access is not authorized.

2. The method of claim 1 further including the step of generating a message to begin a check-in procedure in response to receiving the BLE beacon signal and determining whether entry to the facility is authorized.

3. The method of claim 2 wherein the step of determining whether entry to the facility is authorized includes credentialing.

4. The method of claim 3 further including the step of performing a check-out procedure.

5. The method of claim 4 wherein the eBadge pairs with a credentialing agent's application installed on the smart phone to support communications between a user account and the eBadge.

6. The method of claim 5 wherein the check-out procedure is initiated in response to receiving a signal from a BLE beacon.

7. The method of claim 6 wherein the check-out procedure is initiated in response to receiving input from a user.

8. The method of claim 7 wherein the check-out procedure is initiated in response to an expiration of a timer in the eBadge or smart phone.

9. The method of claim 8 wherein the eBadge is programmed to include a unique identifier.

10. The method of claim 9 wherein the step of determining whether entry to the facility is no longer authorized includes determining whether a time limit has expired.

11. The method of claim 10 wherein the step of determining whether entry to the facility is no longer authorized includes determining whether the eBadge has been detected in an unauthorized area.

12. The method of claim 11 wherein the step of determining whether entry to the facility is no longer authorized includes receiving information that a user of the eBadge has been observed exhibiting a non-compliant behavior.

13. The method of claim 12 wherein the eBadge is also a BLE beacon.

14. The method of claim 13 further including the step of the eBadge transmitting an ID number that identifies information about the eBadge.

15. The method of claim 14 further including the step of the second smart phone receiving the ID number transmitted by an eBadge.

16. The method of claim 15 further including the step of storing the location of each BLE beacon from which a BLE beacon signal was received.

17. The method of claim 16 further including the step of generating a map of a travel path based upon the location of one or more BLE beacons from which a BLE beacon signal was received.

18. The method of claim 17 wherein the credentialing agent's application installed on the smart phone includes user privileges that dictate a level of informational detail accessible concerning an eBadge.

19. A smart phone programmed with an application installed thereon to perform a method including the steps of:
the smart phone receiving a signal from a BLE beacon, wherein the signal from the BLE beacon includes data embedded therein for identifying a location of the BLE beacon and that the smart phone uses to identify its location;
determining whether entry to the facility is authorized;
if entry to the facility is authorized, transferring displayable content from the smart phone to an eBadge indicating access is authorized;
determining whether entry to the facility is no longer authorized using at least a second smart phone to display information associated with eBadges within BLE range of the second smart phone;
if entry to the facility is no longer authorized, transferring displayable content from the smart phone to the eBadge indicating access is not authorized.

20. A method of using a smart phone and an eBadge for facility access, including the steps of:
the smart phone receiving a signal from a BLE beacon, wherein the signal from the BLE beacon includes data embedded therein for identifying a physical location of the BLE beacon relative to the facility and that the smart phone uses to identify its location relative to the physical location identified by the data embedded in the signal from the BLE beacon;
determining whether entry to the facility is authorized;
if entry to the facility is authorized, transferring displayable content from the smart phone to the eBadge indicating access is authorized;
determining whether entry to the facility is no longer authorized, including using a second smart phone to display information associated with eBadges within BLE range of the second smart phone;
if entry to the facility is no longer authorized, transferring displayable content from the smart phone to the eBadge indicating access is not authorized.

21. A method of using a smart phone and an eBadge for facility access, wherein the eBadge is a first BLE beacon, said method including the steps of:
the smart phone receiving a signal from a BLE beacon, wherein the signal from the BLE beacon includes data embedded therein for identifying a location of the BLE beacon and that the smart phone uses to identify its location;
determining whether entry to the facility is authorized;
if entry to the facility is authorized, transferring displayable content from the smart phone to the eBadge indicating access is authorized;
determining whether entry to the facility is no longer authorized by using at least a second smart phone to display information associated with eBadges within BLE range of the second smart phone;
if entry to the facility is no longer authorized, transferring displayable content from the smart phone to the eBadge indicating access is not authorized.

22. A method of using a smart phone and an eBadge for facility access, including the steps of:
the smart phone receiving a signal from a BLE beacon, wherein the signal from the BLE beacon includes data embedded therein for identifying a physical location of the BLE beacon and that the smart phone uses to identify its location;
determining whether entry to the facility is authorized;
if entry to the facility is authorized, transferring displayable content from the smart phone to the eBadge indicating access is authorized;
determining whether entry to the facility is no longer authorized by using at least a second smart phone to display information associated with eBadges within BLE range of the second smart phone;
if entry to the facility is no longer authorized, transferring displayable content from the smart phone to the eBadge indicating access is not authorized;
storing the location of each BLE beacon from which a BLE beacon signal was received;
generating a map of a travel path based upon the location of one or more BLE beacons from which a BLE beacon signal was received.

23. The method of claim 1 wherein the signal received from the BLE beacon identifies an entrance to the facility.

24. The method of claim 1 wherein the signal received from the BLE beacon identifies a floor of the facility.

25. The method of claim 1 wherein the signal received from the BLE beacon identifies a GPS location of the facility.

26. A method of using a smart phone and an eBadge for facility access, including the steps of:
receiving a signal from a BLE beacon, wherein the signal from the BLE beacon includes data embedded therein for identifying a physical location of the BLE beacon and that assists in determining whether entry to the facility is authorized;
using information embedded in the signal received from the BLE beacon to determine whether entry to the facility is authorized;
if entry to the facility is authorized, transferring displayable content from the smart phone to the eBadge indicating access is authorized;
determining whether entry to the facility is no longer authorized by using at least a second smart phone to display information associated with eBadges within BLE range of the second smart phone;
if entry to the facility is no longer authorized, transferring displayable content from the smart phone to the eBadge indicating access is not authorized.

27. A method of using a smart phone and an eBadge for facility access, including the steps of:
the smart phone receiving a signal from a BLE beacon, wherein the signal from the BLE beacon includes data embedded therein for identifying a physical location of the BLE beacon;
determining whether entry to the facility is authorized;
if entry to the facility is authorized, transferring displayable content from the smart phone to the eBadge indicating access is authorized;

determining whether entry to the facility is no longer authorized by using at least a second smart phone to display information associated with eBadges within BLE range of the second smart phone;

if entry to the facility is no longer authorized, transferring displayable content from the smart phone to the eBadge indicating access is not authorized.

28. A method of using a smart phone and an eBadge for facility access, including the steps of:

the smart phone receiving a signal from a BLE beacon, wherein the signal from the BLE beacon includes data embedded therein for identifying a location of the BLE beacon;

determining whether entry to the facility is authorized;

if entry to the facility is authorized, transferring displayable content from the smart phone to the eBadge indicating access is authorized;

determining whether entry to the facility is no longer authorized by using at least a second smart phone to display information associated with eBadges within BLE range of the second smart phone;

if entry to the facility is no longer authorized, transferring displayable content from the smart phone to the eBadge indicating access is not authorized.

29. A method of using a smart phone and an eBadge for facility access, including the steps of:

the smart phone receiving a signal from a BLE beacon, wherein the signal from the BLE beacon includes data embedded therein for identifying a location of the BLE beacon and that the smart phone uses to identify its location;

determining whether entry to the facility is authorized;

determining whether entry to the facility is no longer authorized, by using at least a second smart phone to display information associated with eBadges within BLE range of the second smart phone.

30. The method of claim 29 further including the step of generating a message to begin a check-in procedure in response to receiving the BLE beacon signal and determining whether entry to the facility is authorized.

31. The method of claim 30 wherein the step of determining whether entry to the facility is authorized includes credentialing.

32. The method of claim 31 further including the step of performing a check-out procedure.

33. The method of claim 32 wherein the eBadge pairs with a credentialing agent's application installed on the smart phone to support communications between a user account and the eBadge.

34. The method of claim 33 wherein the check-out procedure is initiated in response to receiving a signal from a BLE beacon.

35. The method of claim 34 wherein the check-out procedure is initiated in response to receiving input from a user.

36. The method of claim 35 wherein the check-out procedure is initiated in response to an expiration of a timer in the eBadge or smart phone.

37. The method of claim 36 wherein the eBadge is programmed to include a unique identifier.

38. The method of claim 37 wherein the step of determining whether entry to the facility is no longer authorized includes determining whether a time limit has expired.

39. The method of claim 38 wherein the step of determining whether entry to the facility is no longer authorized includes determining whether the eBadge has been detected in an unauthorized area.

40. The method of claim 39 wherein the step of determining whether entry to the facility is no longer authorized includes receiving information that a user of the eBadge has been observed exhibiting a non-compliant behavior.

41. The method of claim 40 wherein the eBadge is also a BLE beacon.

42. The method of claim 41 further including the step of the eBadge transmitting an ID number that identifies information about the eBadge.

43. The method of claim 42 further including the step of the second smart phone receiving the ID number transmitted by an eBadge.

44. The method of claim 43 further including the step of storing the location of each BLE beacon from which a BLE beacon signal was received.

45. The method of claim 44 further including the step of generating a map of a travel path based upon the location of one or more BLE beacons from which a BLE beacon signal was received.

46. The method of claim 45 wherein the credentialing agent's application installed on the smart phone includes user privileges that dictate a level of informational detail accessible concerning an eBadge.

* * * * *